(12) United States Patent
Dimitrov et al.

(10) Patent No.: US 12,705,640 B2
(45) Date of Patent: Aug. 11, 2026

(54) MACHINE LEARNING MODELS FOR DATA-PLACEMENT ANALYSIS

(71) Applicant: STACKADAPT, INC., Toronto (CA)

(72) Inventors: Nedialko Boyanov Dimitrov, Toronto (CA); Hongkai Yu, Toronto (CA)

(73) Assignee: Stackadapt, Inc., Toronto (CA)

( * ) Notice: Subject to any disclaimer, the term of this patent is extended or adjusted under 35 U.S.C. 154(b) by 0 days.

(21) Appl. No.: 19/046,052

(22) Filed: Feb. 5, 2025

(65) Prior Publication Data

US 2025/0252457 A1 Aug. 7, 2025

Related U.S. Application Data

(60) Provisional application No. 63/550,153, filed on Feb. 6, 2024.

(51) Int. Cl.
*G06Q 30/0242* (2023.01)
*H04L 67/50* (2022.01)

(52) U.S. Cl.
CPC ....... *G06Q 30/0242* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 11,238,367 | B1 * | 2/2022 | Liu | G06N 20/00 |
| 11,367,083 | B1 * | 6/2022 | Saurabh | G06Q 30/02 |
| 2017/0337276 | A1 * | 11/2017 | Obenzinger | G06F 16/951 |
| 2019/0236488 | A1 * | 8/2019 | Achan | H04L 67/55 |
| 2021/0232478 | A1 * | 7/2021 | M Y | G06N 20/00 |
| 2021/0256568 | A1 * | 8/2021 | Dimitrov | G06N 7/01 |

OTHER PUBLICATIONS

PCT International Search Report and Written Opinion for Application No. PCT/CA2025/050151 mailing date Apr. 14, 2025, 9 pages.

* cited by examiner

*Primary Examiner* — Allan J Woodworth, II
(74) *Attorney, Agent, or Firm* — Foley & Lardner LLP

(57) ABSTRACT

Computing systems and methods for analyzing online interactions with online content data to evaluate the effectiveness of the online content. Outputs may be used to generate graphical user interface visual representations of the effectiveness and/or automate bidding to real-time bidding (RTB) servers. A computer obtains end-users' interaction data associated with online content from various data sources, such as pixel data. For each end-user, the computer generates a feature vector and modified feature vector using the interaction data; executes a machine-learning architecture to generate predicted likelihoods of conversion using the feature vectors; and computes a confidence score using the first and second likelihoods of conversion. The computer generates an effectiveness rate for the online content based upon the confidence scores of the end-users. The computer transmits a bid for new online content to an RTB-server hosting an available webpage, when the computer determines the effectiveness rate satisfies a bid threshold.

20 Claims, 5 Drawing Sheets

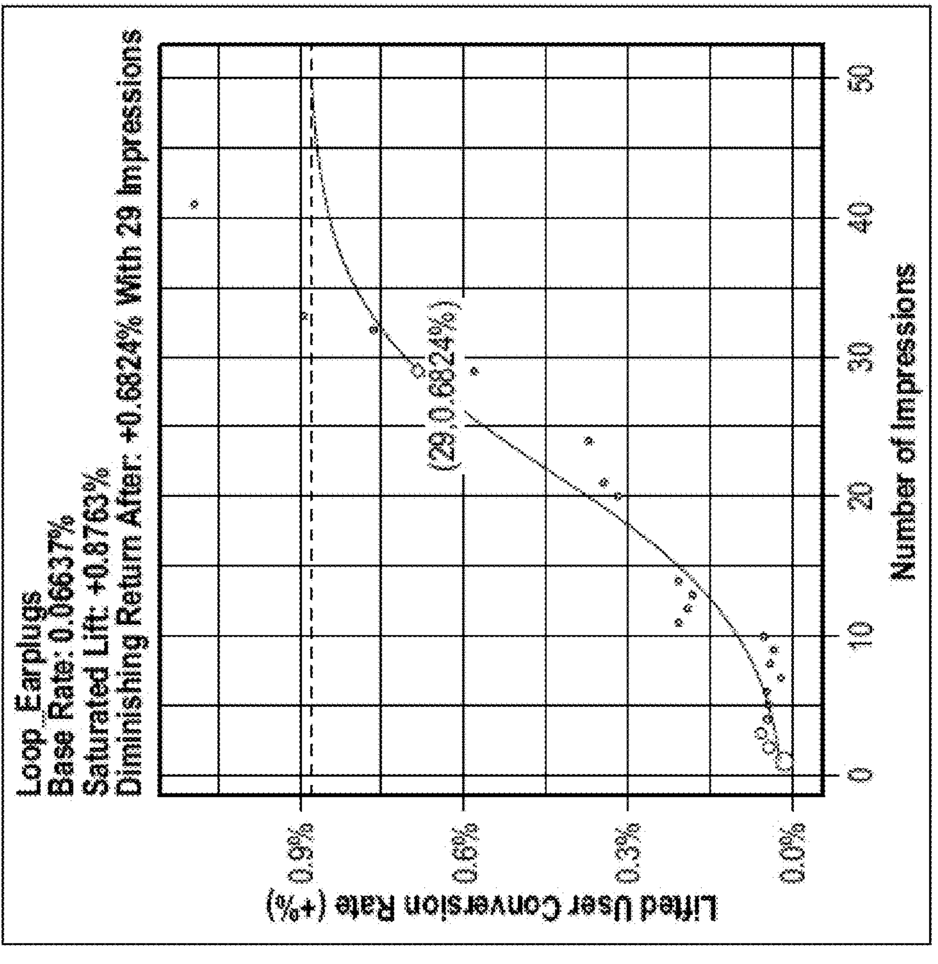
FIG. 2B
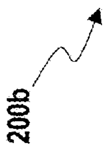

MACHINE LEARNING MODELS FOR DATA-PLACEMENT ANALYSIS

CROSS-REFERENCE TO RELATED APPLICATIONS

This application claims the benefit of and priority to U.S. Provisional Application No. 63/550,153, filed Feb. 6, 2024, which is incorporated by reference in its entirety.

TECHNICAL FIELD

This application relates generally to systems and methods for using machine learning (ML) models to analyze the effectiveness of content exposed to an audience. More specifically, embodiments provide for a trained machine-learning architecture for content providers to efficiently and effectively measure the effectiveness of particular online (or web) content to influence certain audiences of online users based upon various types of data from web-based device interactions.

BACKGROUND

Prior art systems allow for connecting content from content campaigns, domains, and sources with an audience and executing a statistical model to analyze a rate of conversion. For example, a content provider may execute a T-test on a content domain to determine a conversion rate for the audience exposed to the content campaign, domains, and sources. This method has various technical shortcomings as a basis for analysis. For example, the content provider executing the T-test may not follow a normal distribution, which is an assumption of the T-test. If the assumption is not maintained, then the results of the T-test may not be valid. In another example, T-tests may be sensitive to outliers in data to disproportionately influence the analysis and lead to incorrect conclusions.

Another shortcoming of the conventional solutions is that the results of the analysis tend to provide false information at smaller sample sizes and cannot include audiences not exposed to the content campaign. For example, conventional statistical models may be less reliable with small samples sizes to make it more difficult to detect differences because of an increase of variability. Furthermore, the conventional solutions cannot create a statistical analysis for members of the audience who are not exposed to the content campaign.

SUMMARY

What is needed is a means for constructing an analysis for audiences exposed to the content campaigns while providing a model to gauge conversions of audiences not exposed to the content campaign. The systems and methods disclosed herein are intended to address these shortcomings, but may also provide additional or alternative benefits as well. Disclosed herein are systems and methods that address the above-discussed shortcomings in the art and may also provide any number of additional or alternative benefits as well.

In some embodiments, computer-implemented methods or computing systems having computing hardware and software for tracking or tracing web communications or other online interactions with for web or online content data. In some embodiments, a computer comprising one or more processors and software components may obtain interaction data for a plurality of end-users associated with web content data via one or more data sources, including conversion pixel data obtained via a graphical interface for the web content data. The computer may, for each end-user, generate a feature vector for the end-user using the interaction data for the end-user, including an amount of data-placement instances and an amount of conversion instances indicated by conversion pixel data; generate a modified feature vector for the end-user having the amount of data-placement instances as a forced-zero amount of instances; execute a machine-learning architecture to generate a first likelihood of conversion for the end-user using the first feature vector and a second likelihood of conversion for the end-user using the modified feature vector; and compute a confidence score based upon a distance between the first likelihood of conversion and the second likelihood of conversion. The computer may generate an effectiveness rate for the web content data based upon each confidence score computed for each end-user. The computer may transmit a content placement input (e.g., bid) for a next web content data to an external server hosting an available webpage, in response to the computer determining that the effectiveness rate satisfies a content placement input threshold rate.

The computer may generate a visual representation of the effectiveness rate at each data-placement instance corresponding to the first likelihood of conversion and second likelihood of conversion. The visual representation may indicate the content placement input threshold for the web content data.

The modified vector may include one or more features of the plurality of features of the feature vector for the end-user.

The one or more data sources may include bidstream data indicating at least one of user availability, a set of user data-placements, or tracking-pixel data indicating instances of conversions.

The one or more data sources may include the conversion pixel data indicating the amount of data-placement instances and an amount of conversion instances. The interaction data for the end-user may include a user identifier associated with the end-user.

The computer may receive bidstream data from a third-party server, where the one or more data sources includes the bidstream data. At a sampling interval, the computer may retrieve, from a user database, the bidstream data for the plurality of end-users in a targeting group identified by the third-party server.

The feature vector for the end-user may include at least one of an availability of the end-user, or the availability of the end-user identifying a frequency of interaction with one or more end-user computing devices.

The computer may receive a request for one or more content effectiveness indicators via a configuration portal accessible to a content handler device.

When generating the second likelihood of conversion for the end-user using the modified feature vector, the computer may further generate, by executing the machine-learning architecture, a third likelihood of conversion for the end-user using a third feature vector.

The computer may correlate the first likelihood of conversion, the second likelihood of conversion, and the third likelihood of conversion to determine the distance between the first likelihood of conversion, the second likelihood of conversion, and a third likelihood of conversion.

BRIEF DESCRIPTION OF THE DRAWINGS

FIGS. 2B-2C illustrate user interfaces for displaying, via a dashboard user interface, results of implementing machine-learning models of an machine-learning architecture for generating effective analysis of content campaigns, according to an embodiment.

DETAILED DESCRIPTION

Figure 1:
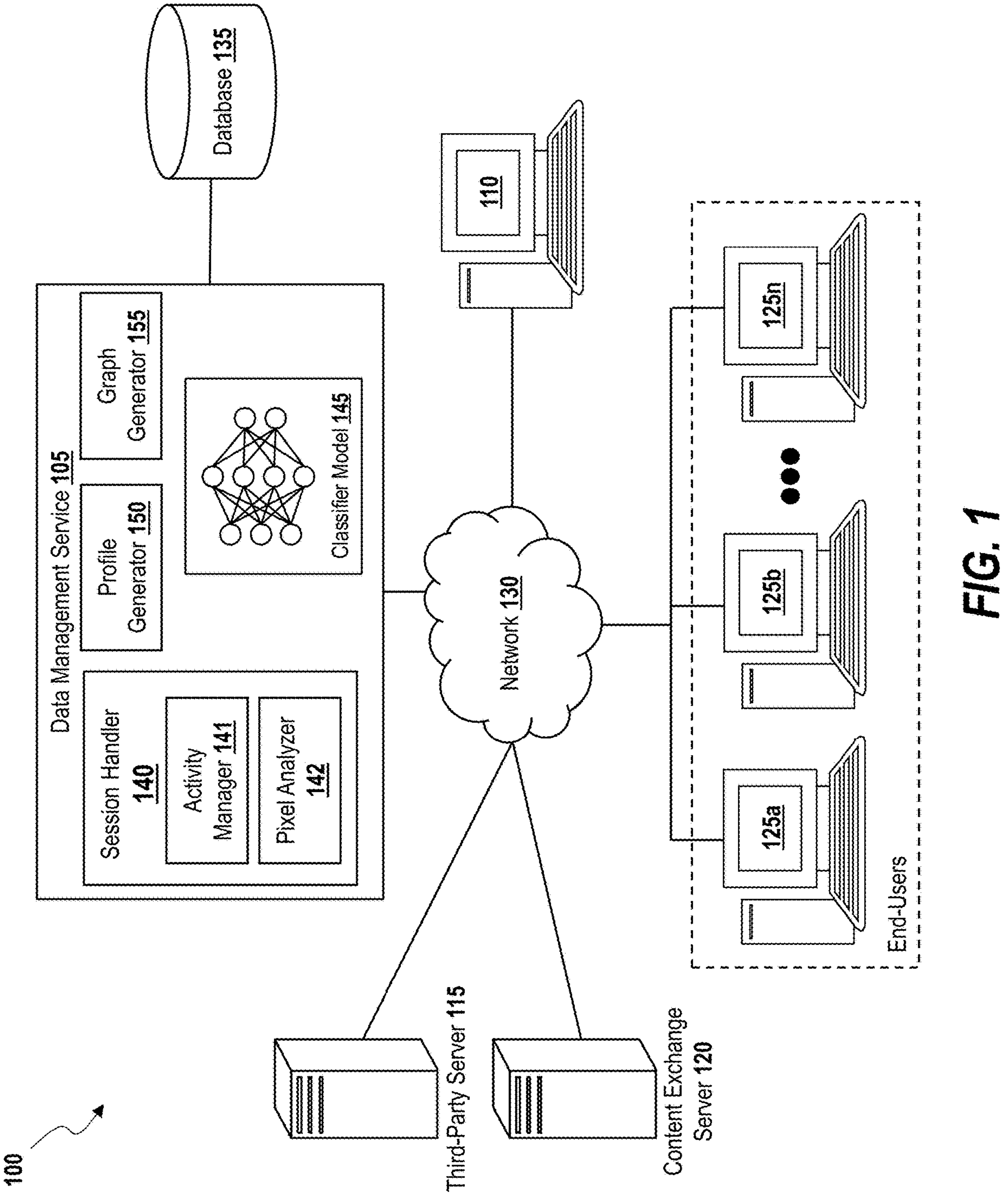
FIG. 1 illustrates a block diagram of a distributed computer system for generating effective analysis of content campaigns, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Embodiments described herein include a system of one or more computing devices that receive a plurality of web or online content objects from a plurality of data sources for web or online content-data placement. A server of the system can extract, recognize, and organize the content objects from a plurality of data types. The server can include programming to identify the various types of data for deriving data-pairs of the content objects. Non-limiting examples of data-pairs of the content stream include: [user identifier, content]; [anonymized identifier, content]; and [HashedIPAddress, URL]; among others. The server can identify or determine associations between end-user devices, content, topics, domains, and pixels of web-content containers (e.g., webpages). The associations can indicate how often an end-user is exposed to the webpage or domain. The server may identify an identifier for an end-user device that has access the webpage or the domain. In some arrangements, the server can capture and the store the device identifiers and/or cookie information association with the webpage. Non-limiting examples of the identifier(s) may include a network address associated with the end-user's device, such as an Internet Protocol (IP) address, a hashed IP address, or a media access control (MAC) address, a unique user identifier, a unique device identifier (sometimes referred to as a "UDID," "device unique identifier," "DUID," or the like), an account identifier, or an identifier for advertiser (IDFA), among others.

The computing system can collect and process content to derive information about the online content object and the end-user who access the online content and analyze the content object associated with the content. The server can use a machine learning (ML) model to analyze the content objects to learn the associations and patterns of the end-users. The ML model can use the metadata of the content object to classify the patterns of end-users and use the pixel data (or tracking-pixel data) of pixels of the computing device to calculate conversion rates of impressions (sometimes referred to as data-placement locations or data-placements) from the content object. The ML model may output a model of the effectiveness of the content objects (sometimes referred to as content data or web content data) when interacting with the end-user.

The ML model may generate an analysis based on end-users who were not exposed to the content objects. The ML model can change the parameters of the input function in order to estimate the end-users not exposed to the content objects and can remove bias using one or more vector decomposition techniques to reduce collinearity between the variables and parameters.

FIG. 1 illustrates a block diagram of a distributed computer system 100 for generating effective analysis of content campaigns. The system 100 may include one or more data management servers 105, content provider devices 110 (sometimes herein referred to as client device) associated with a content provider preparing a content delivery campaign, external third-party servers 115, content exchange servers 120 (sometimes referred to herein as "real-time bidding servers" or "RTB servers"), and end-user devices 125*a*-125*n* (generally referred to as end-user devices 125 or an end-user device 125), among others. The end-user devices 125 communicatively coupled with one another via one or more networks 130.

The data management service of the data management server 105 includes software programming that defines or otherwise functions as a session handler 140, at least one ML classifier model 145 (generally referred to as a "classifier model 145" or "classifier models 145"), and a profile generator 150. The data management server 105 includes, or is in communication with, one or more databases 135. Each of the components in the system 100 may execute various software programming on one or more hardware processors coupled with memory to execute various operations. Certain components of the system 100 may be embodied in a single computing device or multiple computing devices.

The network(s) 130 includes any number of private or public networks for hosting and conducting electronic communications between electronic devices of the system 100. The network 130 may include telecommunications networks or data communications networks comprising hardware or software components for exchanging data between the devices of the system 100 in accordance with any number of telephony or networked communications.

The computing devices of the system 100 (e.g., servers, end-user devices 125, content provider devices 110) may include one or more computing devices and any type of computing device comprising hardware and software components configured to perform the various processes and tasks described herein, including one or more processors or software comprising machine-executable instructions executed by the one or more processors. Non-limiting examples of such computing devices of the system 100 include server computers, laptop computers, desktop computers, tablet computers, and smartphone mobile devices, among others. One or more servers (or other devices of the system 100), such as the data management server 105, execute webserver software for hosting one or more webpages according to web-related or data-communications protocols and computing languages.

The session handler 140 may include software programming for managing online content from content campaigns, domains, webpages, and data sources. The session handler 140 may gather content objects and process a plurality of content objects. For example, the session handler 140 may gather metadata associated with the content objects and process the content objects for analysis to generate patterns associated with the content objects. The session handler 140 may store metadata and patterns in the database 135 for use by the classifier model 145.

In some embodiments, the session handler 140 includes software programming for a webpage indexer, web crawler, and/or web scraper executing on the placement server 105. In such embodiments, the session handler 140 may gather, aggregate, or retrieve webpages hosted by webserver software executed on the third-party servers 115. Each webpage is an online document in a markup language (e.g., Hypertext Markup Language (HTML)) stored or hosted by webserver software and database of the third-party server 115 and to be displayed on the end-user devices 125. The session handler 140 may extract and download various types of data associated with each webpage, which may include the metadata or header information from the webpage coding or data packet traffic. The data associated with the webpages may include, for example, metadata, fingerprints, pixels, scripts, images, text, and other content thereon. In some cases, the session handler 140 may retrieve or identify a page identifier (e.g., Uniform Resource Locator (URL), web address) corresponding to the webpage. Upon identification, the session handler 140 may store and maintain the data extracted from the webpage or the data traffic into the database 135.

The session handler 140 may include an activity manager 141 and a pixel analyzer 142. The activity manager 141 may track (sometimes referred to as "tracking," "trace," or "tracing"), monitor, or manage one or more activities of the end-user devices 125. For example, the end-user device 125 may shop for a pair of pants on a webpage. The activity manager 141 may track a plurality of threads (e.g., corresponding to tabs on the user interface of the end-user devices 125) and the plurality of processes (e.g., corresponding to new webpages on the user interface of the end-user devices 125) to learn a pattern of content to associate with the end-user device 125. The activity manager 141 may monitor interactions, clicks, page views, among others, with the end-user devices 125. For example, the activity manager 141 may register or store each occurrence of a click on the end-user device.

The activity manager 141 may use one or more frameworks, such as, Django®, Flask®, or Express® to manage sessions of the end-user devices 125. For example, the activity manager 141 may include a session configuration, session engine, session data, expirations and timeout, session security, and logout/clearing sessions in Django® to manage sessions of the end-user devices 125. The activity manager 141 may store end-user data associated with the end-user device 125. For example, the activity manager 141 may store impression information and conversion data based on an interaction with the user interface of the end-user device 125. In some embodiments, the activity manager 141 may handle authentication and authorization to protect the end-user device 125.

The session handler 140 may obtain interaction data for the plurality of end-user devices 125. In some arrangements, the session handler 140 may obtain the interaction data from the activity manager 141. The interaction data may include the activity data, mouse-clicks, screen time on a webpage, content campaign, content domains, data sources, among others. For example, the interaction data may include a plurality of mouse clicks on the user interface of the end-user device 125 and record screen time for the end-user device 125. In another example, an end-user computing device 125 may save an item for a later date. Thus, the session handler 140 may store the interaction between the item and the end-user device 125 as interaction data. In some embodiments, the session handler 140 may store the interaction data in the database 135.

The pixel analyzer 142 may connect with one or more pixels on the user interface of the end-user device 125. For example, the pixel analyzer 142 may connect to a conversion pixel on a webpage. The conversion pixel may provide an indication of the end-user device 125 interacting with the webpage, domain, content campaign, or the content source. For example, an online store selling shoes may have a conversion pixel located on a "thank you" button on confirmation page. The pixel analyzer 142 may transmit the conversion pixel to the session handler to indicate that the end-user device 125 has purchased shoes from the online store. In some embodiments, the pixel analyzer 142 may use a browsing history for the end-user device 125 to determine, identify, or analyze if the end-user device 125 interacted with the impression during a previous time period. If the interaction occurs, the pixel analyzer 142 may transmit the interaction to the classifier models 145 and graph generator 155 as an input to a model generation function.

The session handler 140 may access data associated with the conversion pixel. The data associated with the conversion pixel may indicate an amount of impression instances. For example, the session handler 140 may access the amount of impression instances for the plurality of end-user devices 125. The amount of impression instances may indicate or identify one or more impressions associated with the end-user devices 125. For example, a first end-user computing device may have six impressions transmitted by the third-party server 115.

The data associated with the conversion pixel may indicate an amount of conversion instances. Conversion instances may indicate identify a number of conversions associated with the impressions. For ease of description, a conversion is a confirmation of the end-user device 125 successfully interacting with the one or more impression instances. For example, the pixel analyzer 142 may extract the data associated with the conversion pixel to identify a number of conversions based the interactions with one or more end-user devices 125.

The content provider device 110 may also detect or receive an interaction to initiate the content delivery campaign with the end-user devices 125, according to the impressions and one or more profiles for the end-user devise 125. Upon receipt, the content provider device 110 may provide, send, or transmit an indication to initiate to the session handler 140. The session handler 140 may in turn receive the indication and initiate the content delivery campaign with the target end-user device 125 of targeting group to observe a conversion rate based on the impression.

Subsequently, one of the end-user devices 125 may access a webpage hosted on the third-party server 115. The webpage may include an element (e.g., an inline frame) into which the session handler 140 or the third-party server 115 inserts content (e.g., online advertisement) from an entity associated with the content provider device 110.

Upon reading the element, the end-user device 125 may generate a request for a selection value for inserting content into the element of the webpage. The selection value may be used by the content exchange server 120 to select content (e.g., online advertisement) from the content provider device 110 to place on a webpage accessed by the end-user device 125. The request may include an identifier for the end-user device 125, among other information. The identifier for the end-user device 125 may correspond to one of the identifiers in the definition of the impression. In some embodiments, the end-user device 125 may send the request to the content exchange server 120, and the content exchange server 120 in turn may forward the request to the session handler 140.

The pixel analyzer 142 may communicate with the activity manager 141 to remove bias from the classifier models 145 and graph generator 155 outputs. Removing bias may allow the classifier model 145 and graph generator 155 to generate effective output analysis of the interactions with the content campaigns, content domains, and content sources. Some examples of bias may include demographic bias, device bias, seasonal bias, sampling bias, end-user device 125 journey bias. For example, the activity manager 141 may observe that the end-user device 125 has a high frequency of screen time on a particular webpage and interacts with the conversion pixel at any opportunity given. The pixel analyzer 142 may use a browsing history for the end-user device 125 to find a time between witnessing the impression and interacting with the conversion pixel. Furthermore, the activity manager 141 may gather data of instances in which, the end-user device 125 interacted with the conversion pixel without the impression. The session handler 140 may apply a flag, indication, or identifier to the data to indicate that this data has frequency bias. The activity manager 141 may apply one or more logarithmic functions to smooth the data to represent frequencies in a best screen for the end-user device 125. The best screen represents the bidstream and a scenario for how many interactions would occur in a scaled environment. The activity manager 141 may transmit the best screen to the classifier model 145 and graph generator 155 to generate and present the analysis model without bias.

In some embodiments, the data management server 105 may build a corpus of documents for placement of future campaign content. The session handler 140 may identify the bidstream from which to receive bid requests (sometimes referred to as content placement inputs or content placement requests). A bidstream is a stream of request(s) for bids for placement of campaign content to be used as impressions (or data-placements). Third-party content provides often receive income from campaigns that support the third-party content. The scale of the Internet creates unique problems in handling a large bidstream that may comprise hundreds of millions of requests for bids. To resolve the large sampling issue, the server 105 may sample the bid requests and scrape the provided third-party content located at Uniform Resource Locators (URLs) at a given interval (e.g., sampling interval) or amount of data (e.g., sampling size). This Internet-centric approach allows for efficient scraping and identification of keywords, beacon terms, or fingerprints associated with the third-party content to generate future scores associated with campaign content. This scraping algorithm may create individual corpus snapshots for each URL. The data management server 105 may store the individual corpus snapshots into a corpus database within the database 135.

The profile generator 150 executing on the data management server 105 may generate, determine, or otherwise identify an association between each end-user device 125 and the content, campaigns, sources, webpages to generate a profile for the end-user device. The association may identify instances that the end-user device 125 accessed the webpage. In generating the association, the profile generator 150 may identify a device identifier for the end-user device 125 that accessed the webpages indexed on the database 135. For example, the activity manager 141 may keep track of the end-user devices 125 that accessed the webpages using a cookie on the end-user devices 125. The identifier may be a network address, such as an Internet Protocol (IP) address or a media access control (MAC) address, or a unique user identifier, such as a device identifier, an account identifier, or an identifier for advertiser (IDFA), among others. The profile generator 150 may store and maintain an association between the data or the page identifier for the webpage in the profile, along with the device identifiers for the end-user devices 125 that accessed the webpage. The profile may include all data, identifiers, and associations described above to correspond with the respective end-user device 125. The profile may be stored onto the database 135.

The profile generator 150 may function as a computing system for associating end-user devices 125 with content campaigns, content sources, or content domains. The profile generator 150 may constantly interact and interface with the database 135 by accessing contained records for the content object data (e.g., conversion data with impressions, conversion data without impressions) extracted from the session handler 140, the activity manager 141, and the pixel analyzer 142. For example, end-user device **125*a* (Device 1) and end-user device 125*b* (Device 2) may access content source A (Content 1) through four impressions (IMP=4) and content source B (Content B) with zero impressions (IMP=0), respectively. The record in the database 135 for Device 1 indicates: end-user device 125*a*125*a* accessed content source A through four impressions {Device1; Content A; IMP=4}; end-user device 125*b*125*b* accessed content source B through zero impressions {Device2; Content B; IMP=0}. Therefore, the profile generator 150 may associate end-user device 125*a*125*a* with the one or more impressions associated with content source A and end-user device 125*b*125*b*** with content source B without the use of impressions.

In conjunction, the content provider device 110 may communicate and interface with the data management server 105 to define a new content delivery campaign or update a previously defined delivery campaign, including defining the end-user devices 125, which may include a targeting group or audience, targeted for the content delivery campaign. The content provider device 110 may detect, identify, or otherwise receive a set of inputs from the end-user devices 125 to define the end-user device's 125 content delivery campaign. Using the content provider device 110, the user accesses a campaign configuration webpage hosted by the data management servers 105. As an example, the campaign configuration webpage includes graphical user interface allowing the content-user to enter inputs configuring and defining the content-user's content delivery campaign.

In some embodiments, the configuration inputs may indicate, for example, conversion data, indicating content sources, content campaigns, and content domains that are associated with the impressions or not associated with the impressions. The association with the impressions indicates a conversion rate based on the content shown to the end-user device 125. For example, the impression may be an advertisement of a pair of Adidas® shoes shown on an end-user device 125. The pixel analyzer 142 may register a purchase of the Adidas® shoes from the conversion pixel and transmit the purchase to the classifier model 145 as conversion data to generate an analysis for the advertisement of Adidas® shoes. Thus, the content provider device 110 may continue to show Adidas® shoes to the end-user device 125.

The session handler 140 may extract a plurality of features from the interaction data for the end-user devices 125, such as impression instances, conversion instances, and activity data, among others. The features may have an association with each end-user device 125. For example, the session handler 140 may select, choose, or identify to extract impression instances and conversion instances from a first end-user device 125*a*. In another example, the session handler 140 may select, choose, or identify to extract activity data corresponding to browsing history, and conversion instances from a first end-user device 125*a*.

The session handler 140 may extract the plurality of features to generate a feature vector corresponding to the end-user device 125. The feature vector may include one or more parameters as inputs to the classifier model 145. For example, the feature vector may include the amount of impression instances associated with a first end-user device 125*a*. The session handler 140 may use the feature vectors as an input to the classifier model 145. In another example, the feature vector may include the amount of impression instances, the amount of conversion instances, and a user availability associate with a second end-user computing device 125*d*. The feature vector may include a plurality of forms for each end-user device 125. For example, end-user device 125*a* (Device 1), end-user device 125*b* (Device 2), and end-user device 125*c* (Device3) may be available on one instance in a day (user_availability=1) and interact with eight impressions (IMP=8), may be available on three instances in a day (user_availability=3) and interact with five impressions (IMP=5), and may be available on five instances in a day (user_availability=5) and interact with one impressions (IMP=1) through content source B (ContentB), respectively. The inputs to the input vector are f_vector (Device1, user_availability=1, IMP=8), f_vector (Device2, user_availability=3, IMP=5), f_vector (Device3, user_availability=5, ContentB, IMP=1).

The session handler 140 may generate a modified feature vector for the end-user device 125. The modified feature vector may include similar parameters for the feature vector. For example, the modified feature vector may include parameters for impressions, content, end-user device 125. To generate the modified feature vector, the session handler 140 may change or set the impression parameter to equal zero. For example, end-user device 125*a* (Device1) may be available on one instance in a day (user_availability=1). The modified feature vector may be f_vector (Device1, IMP=0). In another example, a second end-user device 125*b* (Device2) may be available on three instances in a day (user_availability=3). The modified feature vector may be f_vector (Device2, user_availability=3, IMP=0). In another example, a third end-user device 125*c* (Device2) may be available on five instances in a day (user_availability=5) through content source B (ContentB). The modified feature vector may be f_vector (Device3, user_availability=5, ContentB, IMP=0).

The classifier model 145 executing in the data management server 105 may be at least one ML model or architecture to generate one or more likelihoods of conversion for each end-user device 125 using one or more feature vectors. The classifier models 145 may train using a dataset such as, Click-Through Prediction (CTR), Online Advertising Conversion Prediction, Content Segmentation, among others, stored in the database 135. In general, the classifier models 145 receives a set of inputs corresponding to the feature vectors and outputs the one or more likelihoods of conversion for each end-user device 125 using the one or more feature vectors. In some embodiments, the classifier model 145 may train on one or more datasets of one or more systems 100. The classifier models 145 may include any processor-executed machine-learning techniques and algorithms, such as various types of neural networks (e.g., convolutional neural networks (CNNs), deep neural networks (DNNs)), linear regression, logistic regression, k-means, k-nearest neighbors (kNN), Random Forest, XGBoost, support vector machines (SVMs), among others.

The classifier model 145 may include computer readable code programmed and executed in, for example, Scala Spark, Java, Kotlin, Haskell, among others. Using the classifier model 145 with code executed in Scala Spark can increase the performance of one or more computing devices running system 100. For example, using Scala Spark allows for in-memory processing and query optimization for the one or more computing devices running system 100. Furthermore, Scala Spark can allow for the classifier model 145 and the one or more computing devices running system 100 to process large amounts of data or information transmitted to, received by, accessed by the end-user device 125.

The classifier model 145 may generate the one or more likelihoods of conversion for each end-user and/or end-user device 125. The likelihood of conversion may be any data type or format (e.g., value, ratio, percentage) that is an indication of a predicted likelihood of an end-user conversion given certain online campaign content data. The classifier models 145 may generate the likelihood of conversion using various types of inputs data from the data sources, as generated according to the end-user operating the end-user device 125 after interacting with the content campaigns, content sources, data sources, webpages, or web domains, among other online interfaces presenting the online content data. For example, the classifier model 145 may use the inputs of the feature vector corresponding to the end-user and the end-user computing device 125*c* to generate or predict the likelihood of conversion for the given input data for the end-user and the end-user computing device 125.

The classifier model 145 or the session handler 140 may generate and use a modified feature vector to generate as a synthetic representation of the end-user's likelihood of conversion synthetically representing a circumstance in which the end-user never sees online content data. In such cases, the computing programming of the data management server 105 generates the modified feature vector having a preconfigured forced-zero number of impressions (e.g., forced-zero amount of impressions or data-placement instances), thereby representing the circumstance in which the computing device 125 has generated input data for zero impression instances for the online content data. For example, the classifier model 145 may use the inputs of the modified feature vector corresponding to the end-user computing device 125*c* to generate or predict the likelihood of conversion for the end-user computing device 125, in an instance where no interactions or impressions between the end-user computing device 125 and the online content data.

The classifier model 145 may use the feature vector and the modified feature vector to generate one or more likelihoods of conversion for each particular end-user. In some embodiments, may the classifier model 145 or other machine-learning architecture programming of the data management service of the data management server 105 may use interaction data from the activity manager 141 or the session handler 140 to generate or identify patterns or habits of the end-users and the end-user computing devices 125, by implementing various machine-learning operations, such as logistic regression, clustering, or outlier detection functions, among others. In some embodiments, the classifier model 145 can logarithmically transform the feature vectors. In some embodiments, the session handler 140 may normalize and apply a logarithm to the feature vector(s). In some embodiments, the session handler 140 may execute vector decomposition to reduce collinearity for the end-user computing device 125 without a conversion rate.

To handle outliers in the interaction data, the session handler 140 can use Bayesian inference or one or more smoothing techniques. For Bayesian inference, the session handler 140 can apply the one or more likelihoods of conversion to express and update uncertainty as new interaction data, activity data, or profiles become available. In some embodiments, the one or more smoothing techniques can include at least one of exponential moving average (EMA), locally weighted scatterplot smoothing (Lowess), Kernel Smoothing, locally estimated scatterplot smoothing (Loess), among others.

The session handler 140 may compute a confidence score based on the likelihood of conversion output by the classifier model 145. The confidence score may be a numerical value, measure, or metric that may indicate or identify a level of certainty or confidence for the output of the classifier model 145. The confidence score may be a direct reflection of how "confident" the classifier model 145 is regarding the accuracy and/or relevance of the output. For example, the session handler 140 may compute a 0.85 for the confidence score to show high confidence in the output of the classifier model 145. In another example, the session handler 140 may compute a 0.15 for the confidence score to show low confidence in the output of the classifier model 145. In some embodiments, the session handler 140 may feed the classifier model 145 the confidence score to train the classifier model 145. The session handler 140 may assign a weight to each output of the classifier model 145, thus assigning a higher weight to outputs with a higher confidence score. For example, the session handler 140 may assign output A with a high confidence score and output B with a low confidence score. The session handler 140 may feed output A into the classifier model 145 as an input to generate future outputs associated with an end-user in similar manner.

The graph generator 155 may calculate an effectiveness rate for online content data based upon each confidence score computed for each user. The effectiveness rate may be an indication of the effectiveness of the content campaign, content domain, or content source. The effectiveness rate may use a similar scaling to the confidence score. For example, the graph generator 155 may calculate a 0.92 for the effectiveness rate to show that the content campaign was highly effective at the end-user computing device 125. In another example, the graph generator 155 may calculate a 0.004 for the effectiveness rate to show that the content campaign was highly ineffective at the end-user computing device 125. The effectiveness rate may differ for each end-user computing device 125 despite interacting with the same content source. For example, an effectiveness rate of 0.6 for content source A may correspond to end-user computing device 125, an effectiveness rate of 0.51 for content source A may correspond to end-user computing device 125, an effectiveness rate of 0.13 for content source A may correspond to end-user computing device 125, and an effectiveness rate of 0.87 for content A may correspond to end-user computing device 125.

Figure 2A:
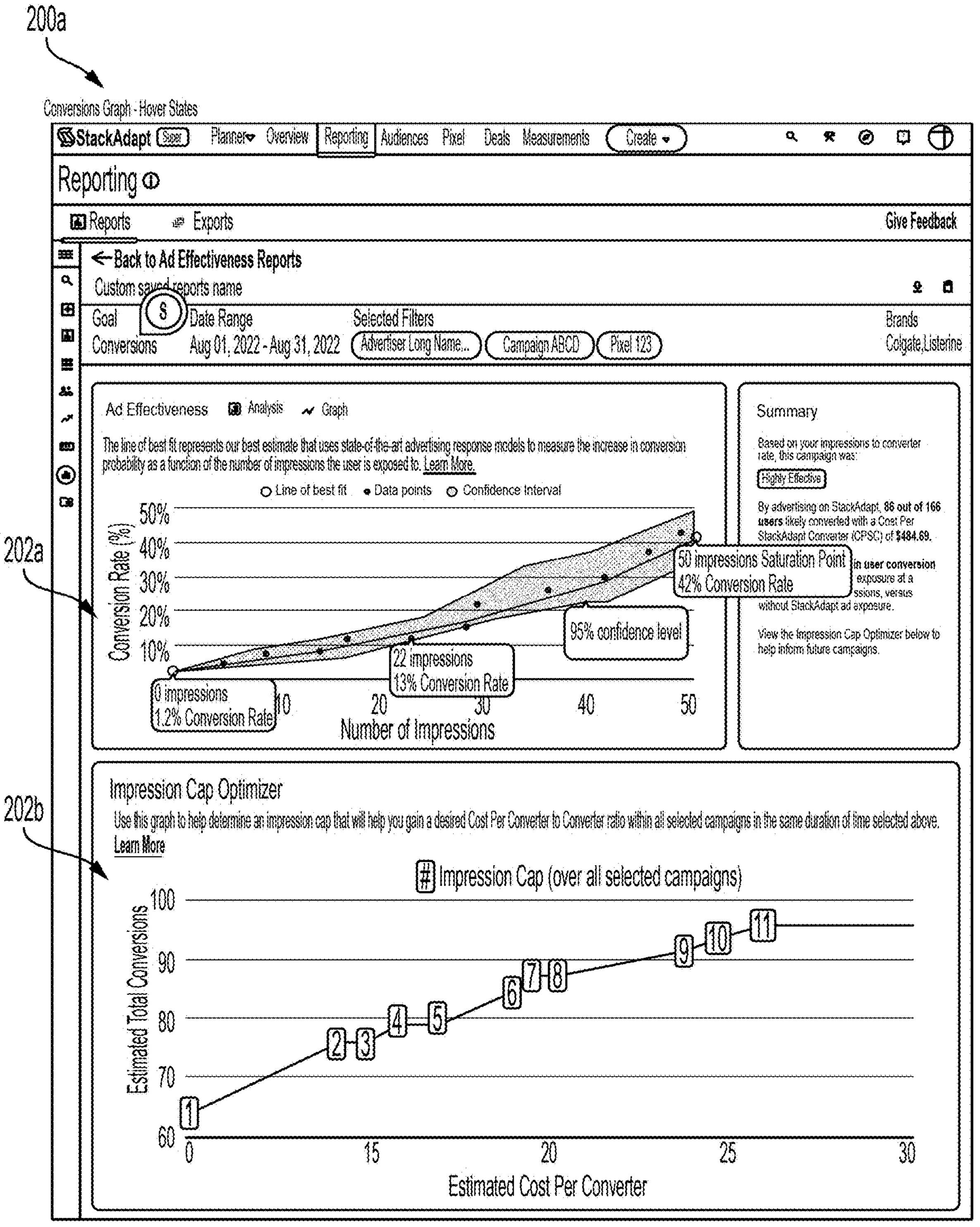
FIG. 2A illustrates a configuration user interface (sometimes referred to as a "dashboard") for configuring and managing web or online data campaigns and for displaying results of implementing machine-learning models of an machine-learning architecture for generating effective analysis of content campaigns, according to an embodiment.

Referring now FIG. 2A, a user interface 200*a* of a configuration portal displays various configuration input fields at an administrative end-user device (e.g., content handler device of the content handler) allowing an administrative user (e.g., content handler) to enter configuration inputs that, for example, configure online content, various thresholds for placing bids at a real-time bidding (RTB) platform, and/or configuring a machine-learning architectures for performing an effectiveness analysis of the online content campaigns as described herein. In this example, the graph generator 155 outputs a one or more visual representations corresponding to the conversion rate based on the number of impressions shown to the end-user computing device 125.

In a first graph display 202*a*, a visual representation displays an effectiveness of the online content, where the effectiveness is represented as a computed predicted conversion rate relative to an expected number of impressions of the online content across multiple end-users. The graph generator 155 may generate a line of best fit for the first graph display 202*a*. The line of best fit may represent an estimation of an increase in conversion probability as a function of the number of impressions an end-user is exposed to. In a second graph display 202*b*, a visual representation displays an effectiveness of the online content at one or more impression caps, where the one or more impression caps is represented as estimated total conversions relative to an estimated cost per converter.

Referring back to FIG. 1, the session handler 140 may use the activity manager 141 and the pixel analyzer 142 to gather interaction data and conversion pixel percentages as an input to the classifier model 145. The session handler 140 may track the interaction data and conversion pixel percents over a period of time, then use an algorithm to provide a feature vector to the classifier model 145. In some embodiments, for example, the feature vector for the particular end-user device 125*b* may include a device identifier (e.g., Device2), online content identifier (e.g., ContentC), a number of impressions (e.g., IMP), an end-user availability (e.g., user_availability), an end-user bowing history, among others. For example, inputs to the feature vector may be {Device2, ContentC, IMP=0} indicating that the end-user device 125*c* interacted with the conversion pixel on content source C and had exposure to zero impressions. The session handler 140 may calculate the confidence score as a baseline since IMP=0. The graph generator 155 may create the baseline for a visual representation using an assumption of IMP=0.

The graph generator 155 may create visual representation of the effectiveness rate at each impression instance corresponding to the likelihood of conversion. The visual representation may be at least one of a scatter plot, bar graph, histogram, a line graph, a box and whisker plot, a logarithmic plot, among others. In interface 200*a*, a scatter plot is illustrated by example. The data points may correspond or correlate to the likelihood of conversions at each instance of impressions during a time period. Using, the scatter plot, the graph generator 155 may generate a confidence interval (or sampling interval) corresponding to the confidence score. The classifier model 145 may adjust the input feature vectors to provide the graph generator 155 with a plurality of data points to generate the confidence interval. For example, the classifier model 145 may adjust the impressions so the graph generator 155 may generate the confidence interval based on the patterns provided by the activity manager 141 or the session handler 140. The confidence interval may grow or shrink based on the availability of data samples. For example, data points near the baseline of the graph may have a low confidence interval because the classifier model 145 estimates the baseline without the use of data from the session handler 140.

The graph generator 155 may create a line of best fit for the scatter plot one or more curve fitting techniques such as, Linear Regression, Power Law Fitting, Spline Interpolation, Nonlinear Least Squares Fitting, Kernal Smoothing, among others. Therefore, the graph generator 155 may use a Nonlinear Least Squares Fitting to create the line of best fit. For example, a logistic function for Nonlinear Least Squares Fitting may have the form Y=Asym/(1+exp ((Xmid−XV/scal)). In another example, the logistic function may have the form y=Asym+(R0−Asym)×exp(−lre×x). In some embodiments, the logistic regression may be code programmed and executed in, for example, Python or R, among others.

Figure 2C:
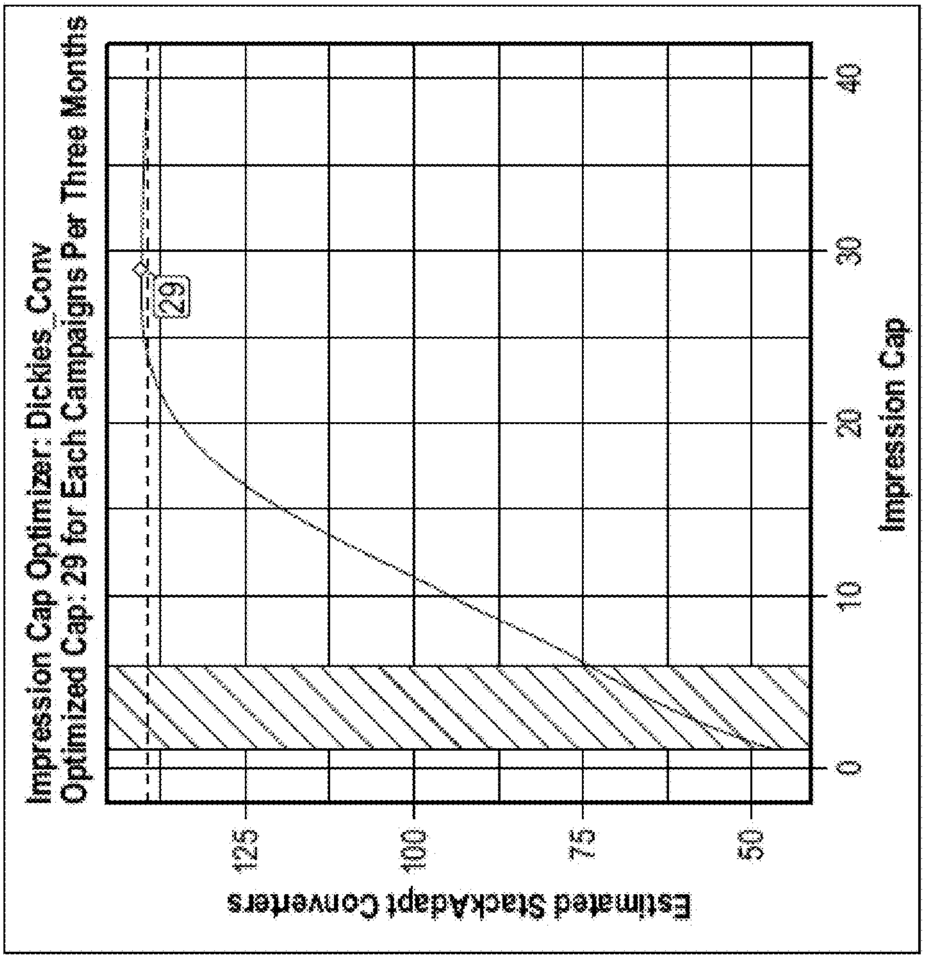
Figure 2C:

Referring to FIGS. 2B-2C, which illustrate user interfaces 200*b* and 200*c* for displaying, via a dashboard user interface, results of implementing machine-learning models of a machine-learning architecture for generating effective analysis of content campaigns. In FIG. 2B, the user interface 200*b* may include a computing device executing, for example, computer code (e.g., Python) for the various layers or functions of the machine-learning architecture to and the generate the interface 200*b*. In some arrangements, the visual representation may indicate an impression cap for the content data.

In FIG. 2C, the impression cap of the user interface 200*c* may be an asymptote or a data point indicating that the effectiveness rate may not increase despite an increase in impression instances. As shown in interface 200*b*, the line of best fit for the scatter plot decreases in slope as the amount of impression instances increase above thirty (30) instances. The session handler 140 may determine whether to submit a bid for the online content data based upon a satisfaction of the impression cap as shown in interface 200*c*. For example, the session handler 140 may submit a bid if the impression cap is satisfied where the impression cap is, for instance, 28 impression instances. The bid may be similar to the data of the bidstream described herein.

To find the impression cap, the graph generator 155 may calculate a marginal effect. In some embodiments, the profile generator 150 can update the profile of an end-user by building a model of the behavior of the end-user with each marginal impression using a Markov Chain. The Markov chain includes the Markov property such that the future state of the system (e.g., end-user behavior) depends on the current state without considering how the system arrived at the current state. Thus, the probability of transitioning to any state depends on the current state and time to allow for the update to the profile to be memoryless. The Markov chain can include state space, transition probabilities, and initial distribution. In some embodiments, the Monte Carlo simulation can infer statistics from the Markov Chain model, such as standard deviation, confidence intervals, median, mean, among others. The marginal effect may be measured by the conversion rate at each instance of impressions. In some embodiments, the impression cap may use the cost of impressions. For example, the cost of a first impression may be less than the cost of ten impressions shown on the end-user computing device 125. If an end-user computing device 125 is exposed to ten impressions, the session handler 140 may indicate that the user associated with the end-user computing device 125 is more available (e.g., user availability) to view impressions. Thus, the number of bids for the end-user computing device 125*c* may increase causing an increase in the cost of the impressions. In some embodiments, the impression cap may be low indication that a cost per acquisition (CPA) is favorable based one or more factors. For example, a first factor can be that an entity of content provider device 110 is unable to spend the entities full budget even though the CPA is more favorable. Thus, the generated impression cap may not be aggressive, but prioritize a scale of the content campaign. The generated impression cap may be aggressive to maximize the budget for the entity. In some embodiments, the impression cap can include campaign spending (e.g., pacing) by using temporal distribution of the bidstream data to account for a tradeoff quality and a tradeoff quantity. The cost per acquisition may correspond to the average cost a business, domain, or entity incurs to acquire a new audience or customer lead through a specific marketing channel, content campaign, content domain, or content source.

In some embodiments, the impression cap may correspond to each end-user computing device 125 by using a second ML model or second classifier model 145. The session handler 140 may feed the second classifier model 145 user availability, browsing history, impression history, user frequency, and the CPA of an additional impression. The second classifier model 145 may output an impression cap (sometimes referred to as an impression threshold or data-placement threshold) for each end-user computing device 125. The session handler 140 may choose an optimal CPA based on the impression cap to maximize the effectiveness of the content campaign, the content domain, or the content source. In some embodiments, the impression cap may be calculated as a probability impression cap instead of an absolute impression cap. For example, an absolute impression cap may be set to impCAP=10, therefore rejecting any bids at an amount greater than the impCAP. Furthermore, the analysis may show data below impCAP=10. In another example, a probabilistic impression cap may be set to be "impCap=10 & rejection probability=80%", meaning rejecting any bids at an amount greater than 10 with the probability of 80%. Unlike the absolute impression cap, the session handler 140 can use 20% of the bids for storage in the database 135, use by the classifier model 145, and use by the graph generator 155.

The session handler 140 may transmit the bid for the online content data to the third part server 115 hosting the webpage, content data, content source, content campaign, or content domain. Along with the bid, the session handler 140 may transmit the visual representation to the third-party server 115. The bid may indicate the bid threshold (sometimes referred to as a content placement input threshold for content placement inputs) to maximize conversion with impression instances for future online content data. For example, the session handler 140 may send the bid to the third-party server 115 for future content data. The bid may further indicate a target audience based on the impression instances.

Figure 3:
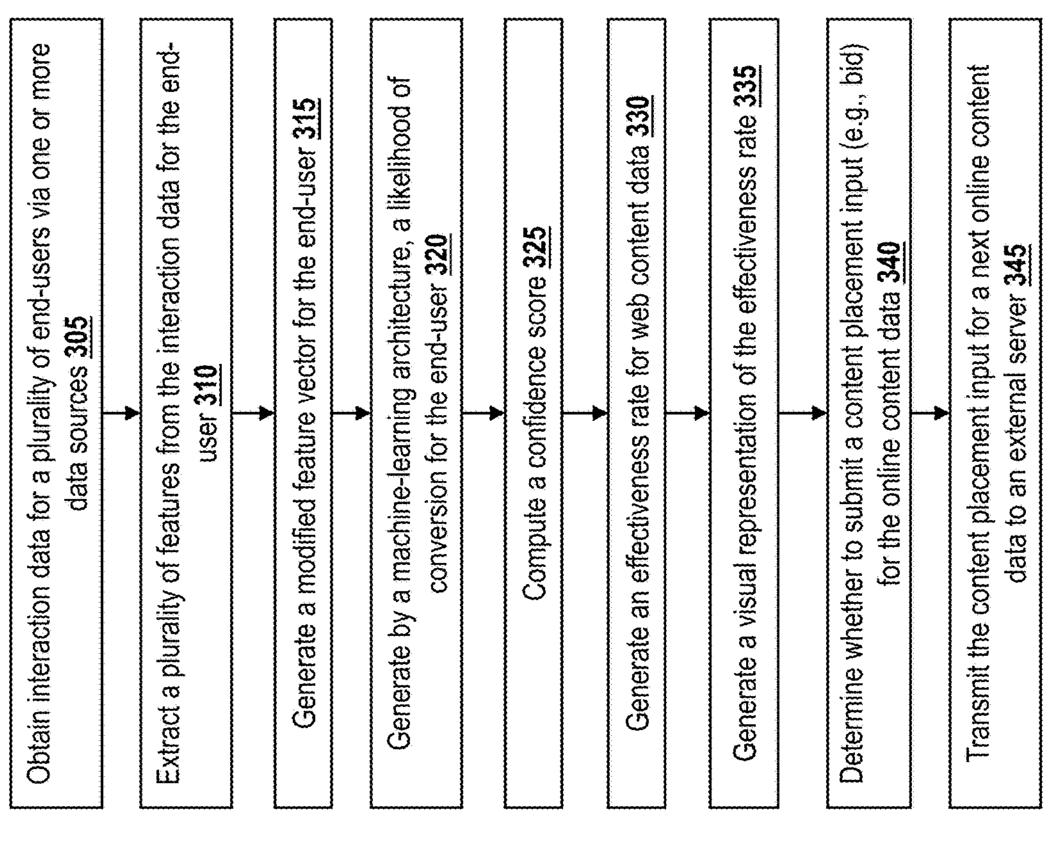
FIG. 3 illustrates a flow chart of a method for generating effective analysis of content campaigns, according to an embodiment.

FIG. 3 depicts a flow chart of a method 300 for generating effective analysis of content campaigns and tracking or tracing web communications for web content data. A server or other computing device having one or more processors may perform various operations described for the computer-implemented method 300 though, in other embodiments, the computer-implemented method 300 or certain aspects of the method 300 may be performed by any number of computing devices and/or by various types of computing devices having at least one processor and/or machine-readable non-transitory storage media. In some embodiments, for example, the method 300 may be performed by one or more components described with respect to the system 100 of FIG. 1.

In operation 305, a session handler 140, an activity manager 141, and a pixel analyzer 142 may obtain interaction data for a plurality of end user computing devices 125 via one or more data sources provided by a third-party server 115 of a third-party servicer, a content exchange server 120, or a content provider device 110. The interaction data may be stored in the database 135. The interaction data may include a user identifier (e.g., IP address, Device ID, browsing history) for each end-user computing device 125. A profile generator 150 may generate a profile for each end-user computing device 125, using the user identifier. The one or more data sources may include one or more conversion pixels. The one or more conversion pixels may include data which indicates an amount of impression instances and an amount of conversion instances. For instance, the server or other computing device obtains interaction data for a plurality of end-users associated with online or web content data via one or more data sources, which may include conversion pixel data obtained via a graphical user interface (e.g., web browser, configuration portal) for the web content data. The one or more data sources may include bidstream data that indicates, for example, user availability, a set of user impressions (or set user of data-placements), and/or tracking-pixel data indicating conversion instances.

In some cases, the session handler 140 and activity manager 141 receive or retrieve bidstream data from a third-party server, where the data sources may include the bidstream data. In a configuration, the session handler 140 and activity manager 141 may retrieve the bidstream data for the plurality of end-users in a targeting group identified by the third-party server. The the session handler 140 and activity manager 141 may retrieve the bidstream data at a sampling interval from a database having user-related data.

In operation 310, the session handler 140 and the activity manager 141 may extract a plurality of features from the interaction data for each end-user computing device 125. The plurality of features may include the amount of impression instances and the amount of conversion instances indicated by the conversion pixel data. After extracting the plurality of features, the session handler 140 and the activity manager 141 may generate a feature vector for each end-user computing device 125. For instance, the server may generate a feature vector for a particular end-user using the interaction data for the end-user. The interaction data may include, for example, an amount of data-placement instances (or impression instances); an amount of conversion instances, as indicated by conversion pixel data; and a modified feature vector for the end-user having the amount of data-placement instances as a forced-zero amount of instances.

In operation 315, the session handler 140 and the activity manager 141 may generate a modified feature vector for the end-user computing device 125. The modified feature vector may be similar to the generated feature vector. The modified feature vector may use zero (0) instances of impressions as the amount of impression instances. The session handler 140 may feed the feature vectors and the modified feature vector to the classifier model 145 for each end-user computing device 125.

In operation 320, the classifier model 145 may generate or output a likelihood of conversion for each end-user computing device 125. The classifier model 145 may conduct parameter estimation, maximum likelihood estimation (MLE), and/or Bayesian inference. The classifier model 145 may calculate the likelihood of conversion as a product of each instance of data for each end-user computing device 125. In some embodiments, the classifier model may execute a log-likelihood to avoid numerical under and overflow to reduce bias within the likelihood of conversion. In response to calculating the likelihood of conversion, the classifier model 145 may transmit the likelihood of conversion to the session handler 140.

In operation 325, the session handler may compute a confidence score based upon a distance between the likelihoods of conversion. The distance may show a level of deviation between one or more likelihoods of conversions for each end-user computing device 125. The confidence score may be calculated by applying an average, a median, a standard deviation, other statistical calculations to the likelihood of conversions for the end-user devices 125. The session handler may transmit the confidence score to a graph generator 155.

In operation 330, the graph generator 155 may generate an effectiveness rate for the online or web content data based upon each confidence score computed for each end-user computing device 125. The effectiveness rate may indicate or identify how effective the content campaign, content data, content source, is at converting a targeted group or audience. For example, a content campaign may have a 90% effectiveness rate for the end-user computer devices 125 (e.g., very effective content), but have a 7.9% effectiveness rate for the end-user computing devices 125 (e.g., very ineffective content). The graph generator 155 or other software component may receive a request for one or more content effectiveness indicators via a configuration portal accessible to a content handler device (e.g., administrator device, content creator device).

In operation 335, the graph generator 155 may generate a visual representation of the effectiveness rate at each impression instance corresponding to the likelihoods of conversion for the end-user computing devices 125. The visual representation (e.g., interface 200*a*, 200*b*) may indicate a bid or content-placement threshold for the content data, content campaign, content source, or content domain.

In operation 340, the session handler 140 may determine whether to submit a bid for the content data, content campaign, content source, or content domain based upon a satisfaction of the bid threshold. The session handler 140 may analyze, scrape, or process the visual representation to find one or more data points to satisfy the bid threshold. The one or more data points may indicate a point of diminishing returns. This occurs as the conversion rate decreases when impression instances increase to a large value. In operation 345, the session handler 140 may transmit the bid for a next content data, content campaign, content source, or content domain to the third-party server 115 hosting an available web-content container, such as an available webpage. For instance, the server transmits a bid content placement input for a next online web content data to an external server hosting an available webpage or other type of web-content container, in response to the computer determining that the effectiveness rate satisfies a bid placement input threshold rate.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for tracing web communications for web content data, the method comprising:

obtaining, by a computer comprising one or more processors, interaction data for a plurality of end-users associated with web content data via one or more data sources, including conversion pixel data obtained via a graphical interface for the web content data associated with an end-user identifier;

for each end-user, generating, by the computer, a feature vector for the end-user using the interaction data for the end-user, including an amount of data-placement instances and an amount of conversion instances indicated by the conversion pixel data;

generating, by the computer, a modified feature vector for the end-user having the amount of data-placement instances as a forced-zero amount of instances and having the amount of conversion instances;

generating, by the computer executing a machine-learning architecture, a first likelihood of conversion for the end-user using the feature vector and a second likelihood of conversion for the end-user using the modified feature vector; and computing, by the computer, a confidence score based upon a distance between the first likelihood of conversion and the second likelihood of conversion;

generating, by the computer, an effectiveness rate for the web content data based upon each confidence score computed for each end-user;

determining, by the computer, that the effectiveness rate satisfies a placement input threshold rate; and in response to receiving a request for next content data including the end-user identifier and an available web-content container and determining that the effectiveness rate of the next web content data associated with the end-user identifier satisfies the placement input threshold rate, generating, by the computer, a content placement input indicating the next web content data associated with the end-user identifier; and transmitting, by the computer, the content placement input indicating the next web content data to an external server hosting the available web-content container indicated by the request, for insertion of the next web content data into the available web-content container.

2. The method of claim 1, further comprising generating, by the one or more processors, a visual representation of the effectiveness rate at each data-placement instance corresponding to the first likelihood of conversion and second likelihood of conversion, wherein the visual representation indicates the placement input threshold for the web content data.

3. The method of claim 1, wherein the modified vector includes one or more features of the plurality of features of the feature vector for the end-user.

4. The method of claim 1, wherein the one or more data sources including bidstream data indicating at least one of user availability, a set of user data-placement, or tracking-pixel data indicating conversion instances.

5. The method of claim 1, wherein the one or more data sources includes the conversion pixel data indicating the amount of data-placement instances and an amount of conversion instances, and wherein the interaction data for the end-user includes a user identifier associated with the end-user.

6. The method of claim 1, further comprising:

receiving, by the one or more processors, bidstream data from a third-party server wherein the one or more data sources includes the bidstream data; and at a sampling interval, retrieving, by the one or more processors, from a user database the bidstream data for the plurality of end-users in a targeting group identified by the third-party server.

7. The method of claim 1, wherein the feature vector for the end-user includes at least one of an availability of the end-user, or the availability of the end-user identifying a frequency of interaction with one or more end-user computing devices.

8. The method of claim 1, further comprising receiving, by the one or more processors, a request for one or more content effectiveness indicators via a configuration portal accessible to a content handler device.

9. The method of claim 1, wherein generating the second likelihood of conversion for the end-user includes generating, by the one or more processors by executing the machine-learning architecture, a third likelihood of conversion for the end-user using a third feature vector.

10. The method of claim 9, further comprising correlating, by the one or more processors, the first likelihood of conversion, the second likelihood of conversion, and the third likelihood of conversion to determine the distance between the first likelihood of conversion, the second likelihood of conversion, and the third likelihood of conversion.

11. A system for tracing web communications for web content data, the system comprising:

a computer comprising one or more processors, the computer configured to:

obtain interaction data for a plurality of end-users associated with web content data via one or more data sources, including conversion pixel data obtained via a graphical user interface for the web content data associated with an end-user identifier;

for each end-user, generate a feature vector for the end-user using the interaction data for the end-user, including an amount of data-placement instances and an amount of conversion instances indicated by conversion pixel data;

generate a modified feature vector for the end-user having the amount of data-placement instances as a forced-zero amount of instances and having the amount of conversion instances;

execute a machine-learning architecture to generate a first likelihood of conversion for the end-user using the feature vector and a second likelihood of conversion for the end-user using the modified feature vector; and compute a confidence score based upon a distance between the first likelihood of conversion and the second likelihood of conversion;

generate an effectiveness rate for the web content data based upon each confidence score computed for each end-user;

determine that the effectiveness rate satisfies a placement input threshold rate; and in response to receiving a request for next content data including the end-user identifier and an available web-content container and determining that the effectiveness rate of next web content data associated with the end-user identifier satisfies the placement input threshold rate, generate a content placement input indicating the next web content data associated with the end-user identifier; and transmit the content placement input indicating the next web content data to an external server hosting the available web-content container indicated by the request, for insertion of the next web content data into the available web-content container.

12. The system according to claim 11, wherein the computer is further configured to generate a visual representation of the effectiveness rate at each data-placement instance corresponding to the first likelihood of conversion and second likelihood of conversion, wherein the visual representation indicates the placement input threshold for the web content data.

13. The system according to claim 11, wherein the modified vector includes one or more features of the plurality of features of the feature vector for the end-user.

14. The system according to claim 11, wherein the one or more data sources including bidstream data indicating at least one of user availability, a set of user data-placements, or tracking-pixel data indicating conversion instances.

15. The system according to claim 11, wherein the one or more data sources includes the conversion pixel data indicating the amount of data-placement instances and an amount of conversion instances, and wherein the interaction data for the end-user includes a user identifier associated with the end-user.

16. The system according to claim 11, wherein the computer is further configured to:

receive bidstream data from a third-party server, wherein the one or more data sources includes the bidstream data; and at a sampling interval, retrieve, from a user database, the bidstream data for the plurality of end-users in a targeting group identified by the third-party server.

17. The system according to claim 11, wherein the feature vector for the end-user includes at least one of an availability of the end-user, or the availability of the end-user identifying a frequency of interaction with one or more end-user computing devices.

18. The system according to claim 11, wherein the computer is further configured to receive a request for one or more content effectiveness indicators via a configuration portal accessible to a content handler device.

19. The system according to claim 11, wherein when generating the second likelihood of conversion for the end-user using the modified feature vector, the computer is further configured to generate, by executing the machine-learning architecture, a third likelihood of conversion for the end-user using a third feature vector.

20. The system according to claim 19, wherein the computer is further configured to correlate the first likelihood of conversion, the second likelihood of conversion, and the third likelihood of conversion to determine the distance between the first likelihood of conversion, the second likelihood of conversion, and the third likelihood of conversion.

* * * * *